Jan. 5, 1960

C. W. LEWIS
ELECTRICAL APPARATUS AND SOLID
DIELECTRIC THEREFOR
Filed March 14, 1956

2,920,256

INVENTOR
Charles W. Lewis.
BY
William J. Addison
ATTORNEY

United States Patent Office 2,920,256
Patented Jan. 5, 1960

2,920,256

ELECTRICAL APPARATUS AND SOLID DIELECTRIC THEREFOR

Charles W. Lewis, Pittsburgh, Pa., assignor to Westinghouse Electric Corporation, East Pittsburgh, Pa., a corporation of Pennsylvania Application March 14, 1956, Serial No. 571,536

6 Claims. (Cl. 317—258)

The present invention relates to electrical apparatus and has particular reference to a solid plastic material characterized by having a high dielectric constant, which material is particularly suitable for use in electrical capacitors and the like.

Heretofore, solid plastic materials have been employed as insulation in electrical apparatus of various kinds. In general, however, such materials, in an unmodified form, have a relatively low dielectric constant. Conventional plastic materials may be modified by incorporating polar plasticizers therein, whereby products having a relatively high dielectric constant are produced. However, such products frequently are soft, rubbery, or tacky materials which have high dissipation factors. The use of such products in capacitors and like electrical apparatus, therefore, has not been completely satisfactory for both physical and electrical reasons.

At the present time, kraft paper is widely used in capacitors to insulate and separate the electrodes from one another. It is necessary to employ two or more layers of the kraft paper between the electrodes in order to reduce the incidence of faults leading to electrical breakdown of the capacitor. The best kraft paper available has a dielectric constant of 5 to 6. Liquid dielectrics are available having dielectric constants as high as about 15. When such liquid dielectrics and high quality kraft paper are used in capacitors, the resultant combination has a dielectric constant only slightly greater than that of the paper. For many years a search has been carried on seeking a solid material having a dielectric constant of approximately 15 which would be suitable for use in capacitors either alone or in combination with liquid dielectrics having such high dielectric constants.

It now has been discovered that electrical apparatus of high capacitance per unit value can be made utilizing the polymeric solid plastic material herein described.

The object of the present invention is to provide a solid plastic material having a relatively high dielectric constant, said material comprising a polymer having cyanoethyl groups in its structure.

A further object of this invention is to provide electrical apparatus insulated with a solid plastic material having a relatively high dielectric constant, said material comprising cyanoethyl cellulose.

Still another object of this invention is to provide electrical capacitors having associated therewith sheet material having a relatively high dielectric constant, said sheet material comprising cyanoethyl cellulose.

Other and further objects of the invention will, in part, be obvious and will, in part, appear hereinafter.

In order to describe the invention more fully, reference is made to the following description taken in conjunction with the accompanying drawing, in which.

This invention, as exemplified in one of its preferred embodiments, relates to an electrical capacitor comprising, in combination, electrodes and a sheet material separating and insulating the electrodes one from the other. The sheet material comprises cyanoethyl cellulose.

Cyanoethyl cellulose may be prepared by reacting cellulose with a relatively large amount of acrylonitrile in the presence of a relatively small amount of water and an alkaline catalyst. In order to indicate one convenient method for preparing cyanoethyl cellulose, the following specific example is set forth. The parts given are by weight unless otherwise indicated.

*Example 1*

Forty parts of cellulose are soaked in 400 parts of 2% sodium hydroxide for 1.5 hours. The liquid then is decanted, and the cellulose is pressed between sheets of blotting paper. The wet cellulose, constituting about 100 parts, then is transferred to a suitable reaction vessel equipped with a reflux condenser to which is added 680 parts of acrylonitrile. The mixture is heated and stirred until refluxing commences. External heat is removed and the exothermic reaction is allowed to continue for about 80 minutes whereupon the cellulose is completely dissolved. Since the cellulose has been completely dissolved its original fibrous structure has been destroyed. The resultant fluid is poured into a suitable vessel containing about 500 parts of water and a few large pieces of Dry Ice. The Dry Ice is effective in agitating the liquid and neutralizing the alkali. After 5 minutes the liquid is decanted, and fresh water and Dry Ice are added. The washing is continued until the washings are clear, colorless and neutral. During the washing the cyanoethyl cellulose product changes from a gummy mass to a collection of small, hard, non-fibrous light yellow granules. Further purification may be achieved by dissolving the product in acetone and precipitating it from a large excess of water. Since more than six times as many parts by weight of acrylonitrile are used as celluose the resultant non-fibrous cyanoethyl cellulose product necessarily contains about 13% nitrogen.

Figure 1:
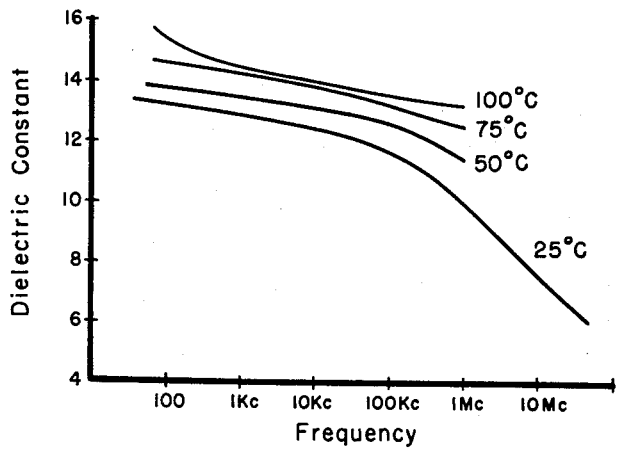
Figure 1 is a graph plotting the dielectric constant against frequeincy of cyanoethyl cellulose as measured at four different temperatures.
Figure 2:
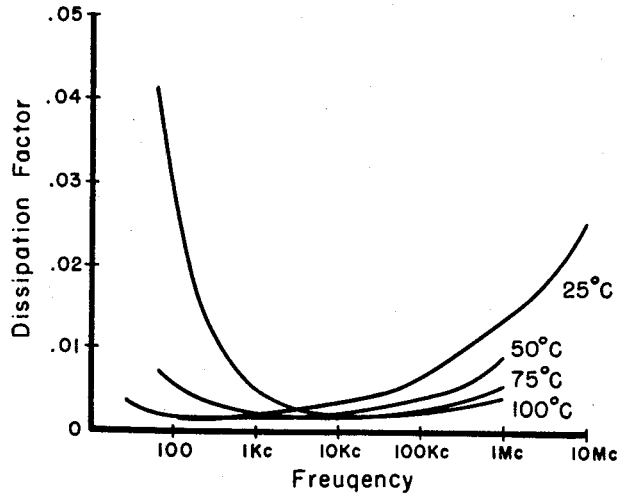
Fig. 2 is a graph plotting the dissipation factor against frequency of cyanoethyl cellulose as measured at four different temperatures.

In order to determine the electrical properties of the cyanoethyl cellulose thus prepared, a portion of it was molded into discs 1 inch in diameter and ⅛ inch thick for testing. The discs were molded at a temperature of 175° C. under a pressure of 8000 p.s.i. Lead foil electrodes were attached to the sides of the discs with silicone grease. Measurements of the dielectric constant and the dissipation factor of the cyanoethyl cellulose discs at frequencies below 500 kilocycles were made using a General Radio Schering bridge. At higher frequencies a susceptance variation, resonant circuit method was used. The results of these determinations, made at four different temperatures, are set forth in Figs. 1 and 2 of the drawing.

These results demonstrate that cyanoethyl cellulose, a solid plastic material, has an unexpectedly high dielectric constant and moreover, is a material which does not have high dielectric losses particularly at temperatures below 100° C. These properties are totally unexpected.

Cyanoethyl cellulose is suitable for use in any of several different physical forms. Thus, it may be dissolved in a suitable solvent such as acetone, aniline, pyridine or the like and cast in the form of films. If the acetone solution is introduced into water with stirring, the cyanoethyl cellulose will precipitate in the form of fibers which may be made into a paper in accordance with conventional paper making techniques. Such fibers also may be converted into the form of mats simply by subjecting a mass of such fibers to a relatively low temperature and pressure.

The cyanoethyl cellulose also may be impregnated into and coated on fibrous material for use in capacitors and other electrical apparatus. Thus, cyanoethyl cellulose may be applied, for example, as a solution, to fibrous material such as kraft paper, sheet material composed of both glass fibers and kraft wood fibers prepared as described in U.S. 2,504,744, glass paper prepared as described in U.S. 2,728,699, and the like. The fibrous material should contain the cyanoethyl cellulose in an amount of at least 25% by weight.

Figure 3:
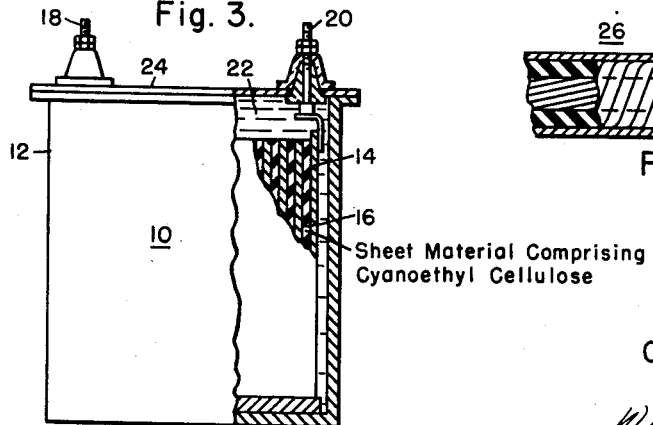
Fig. 3 is a view in elevation, partly in section, of a capacitor.

Referring to Fig. 3 of the drawing, the invention now will be described with respect to the preparation of a capacitor. The capacitor 10 comprises a sealed metal casing 12 within which are located a plurality of separate metallic foil electrodes 14. Generally, there will be a pair of electrodes composed of an electrically conductive metal such as aluminum, tin, copper, or the like. The electrodes are separated from one another by at least one layer of a sheet material 16 comprising cyanoethyl cellulose, which may be prepared in the manner described in Example I. The film or sheet material 16 may vary in thickness from about 0.1 to 10 mils. The metallic sheets which form the electrodes are tightly wound with the polymeric sheet material 16 interposed therebetween to prevent electrical contact. The wound capacitor element then is inserted within the casing 12 and connected to terminal contact members 18 and 20.

Generally, the assembly is subjected to a heat treatment under vacuum to remove all traces of moisture and other volatile substances. After the heat treatment and while still under vacuum, a dielectric fluid 22 is introduced into the casing 12. A hermetically sealed cover member 24 is applied to casing 12 thereby providing a complete capacitor.

The liquid dielectric fluid employed in the capacitors of this invention comprises a material which is liquid at operating temperatures. It is desirable that the dielectric liquid be fluid down to temperatures as low as about −40° C. Halogenated aromatic hydrocarbons may be employed either alone or in combination with other liquid dielectrics of high dielectric constant.

Satisfactory liquid dielectrics also comprise chlorinated diphenyl compounds in admixture with diaryl sulfones. The sulfone component consists of one or more compounds having a molecular formula which may be represented as

wherein R and R' are aromatic hydrocarbon radicals which may be alike or different. Examples of suitable diaryl sulfones include diphenyl sulfone and alkyl substituted diphenyl sulfones. Examples of suitable mixtures of such diaryl sulfones and chlorinated diphenyls include mixtures of 90 to 75 parts by weight of 50% to 60% chlorinated diphenyl sulfone, phenyl xylyl sulfone or tolyl xylyl sulfone. When combined in substantially these proportions, the components produce liquids which may be employed for impregnating capacitors with a high degree of satisfactory operation. The dielectric constant will be high. The sulfone may be combined with the chlorinated diphenyl by introducing pulverized sulfone into the heated chlorinated diphenyl liquid and stirring. A liquid mixture is produced.

Sulfones which produce satisfactory mixtures include phenyl xylyl sulfone and tolyl xylyl sulfone and they have produced advantageous compositions with diphenyl chlorinated to 50 to 60% of maximum chlorination. It has been noticed that the greater the number of sulfone isomers present, the more compatible the sulfones are with halogenated aryls. The increase in the number of side chains of the derivatives of diphenyl sulfones also appears to improve the compatibility.

While the mixture of sulfones and halogenated diphenyls provide excellent dielectrics, other chlorinated aromatics may be employed to replace a part of the chlorinated diphenyl to promote a low freezing point. Thus, chlorinated benzene and alkyl substituted benzene such as trichlorbenzene, tetrachlorbenzene, tetrachlorethylbenzene and pentachlorethylbenzene are examples of such other aromatic materials suitable for this purpose. Furthermore, mineral oil and vegetable oil have been found to be suitable for use as a liquid dielectric in accordance with this invention.

To illustrate the invention more fully, the following examples are set forth to show the improved results obtainable from capacitors prepared in accordance with this invention.

*Example II*

A capacitor was prepared by placing a sheet of aluminum foil on either side of a film or sheet composed entirely of cyanoethyl cellulose having a thickness of 2.8 mils. The sheets were wound together tightly after which the assemblage was inserted into a casing and the foil electrodes were connected to contact members. The unit then was vacuum impregnated with mineral oil to produce a finished capacitor. The capacitance of this capacitor, measured at 60 cycles and a temperature of about 29° C., was 0.0019 mf. The capacitance was about twice as high as that which could be obtained with a similar capacitor using kraft paper between the foil.

*Example III*

A capacitor was prepared by tightly winding a sheet of cyanoethyl cellulose-impregnated kraft paper between two sheets of aluminum foil. The kraft paper had a thickness of 0.5 mil before impregnation and a thickness of 0.7 mil after impregnation. The wound sheets were placed in a container, the aluminum foil electrodes were connected to terminals, and the resulting unit was vacuum impregnated with a liquid dielectric consisting of 75 parts by weight of 50% chlorinated diphenyl and 25 parts by weight of tolyl xylyl sulfone. This capacitor was found to have an effective dielectric constant of 9.8, which is approximately 40–50% greater than the capacitance of a similar capacitor containing kraft paper which had not been impregnated with cyanoethyl cellulose.

*Example IV*

Example III was repeated with the exception that the kraft paper was impregnated and coated with sufficient cyanoethyl cellulose whereby it had a final thickness of 1 mil. This capacitor also had a capacitance approximately 50% greater than the capacitance of a similar capacitor containing kraft paper which had not been impregnated with cyanoethyl cellulose.

The liquid dielectrics employed in Examples III and IV have dielectric constants comparable to the dielectric constant of the sheet material. Highly satisfactory capacitors are obtained as a result of the use of both high dielectric constant liquid and solid insulation having closely comparable values.

Figure 4:
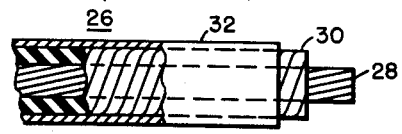
Fig. 4 is a fragmentary view, partly in section, of a cable.

While cyanoethyl cellulose gives outstanding results when employed in association with dielectric fluids in capacitors, it also may be employed in numerous other forms of electrical apparatus. Thus, the polymers of this invention and the liquid dielectrics herein described may be employed in combination, in some cases, as cable insulation. Referring to Fig. 4 of the drawing, there is illustrated a cable 26 comprising a conductor 28 about which there is a pliant wrapping of sheet material 30 comprising cyanoethyl cellulose in paper form. The sheet material is impregnated with any of the fluid dielectrics described hereinabove. An outer covering or sheet 32 of lead or any suitable metal provides for the maintenance of a proper hermetic seal for the impregnated insulation 30.

Although the invention has been described with particular respect to the manufacture of capacitors and cables including a fluid dielectric in association with the polymeric cyanoethyl cellulose, it will be understood that the cyanoethyl cellulose may be used alone in capacitors and in other electrical apparatus where only low voltages are encountered.

Thus, the solid high dielectric constant cyanoethyl cellulose of this invention also is suitable for use in the manufacture of electroluminescent screens and in such other applications where storage of electrical energy or the controlled distribution of electrical stresses is important. Broadly, an electroluminescent screen, embodying the cyanoethyl cellulose of this invention, would comprise at least a pair of electrodes at least one of which is transparent and a relatively thick sheet of cyanoethyl cellulose, with suitable phosphors present therein, disposed between the electrodes.

While the present invention has been described with respect to certain specific embodiments thereof, it will be understood, of course, that certain changes, substitutions, modifications and the like may be made therein without departing from its true scope.

I claim as my invention:

1. An electrical capacitor comprising, in combination, electrodes, and a sheet material separating and insulating the electrodes from one another, the sheet material comprising cyanoethyl cellulose containing about 13% nitrogen.

2. An electrical capacitor comprising, in combination, a pair of electrodes composed of electrically conducting metal, a sheet material separating and insulating the electrodes from one another, and a liquid dielectric cooperatively associated with the electrodes and sheet material, the sheet material comprising cyanoethyl cellulose containing about 13% nitrogen.

3. An electrical capacitor comprising, in combination, a casing, a pair of electrodes composed of electrically conducting metal in the casing, a sheet material separating and insulating the electrodes from one another, and a liquid dielectric applied to the electrodes and sheet material in the casing, the sheet material consisting essentially of cyanoethyl cellulose containing about 13% nitrogen.

4. An electrical capacitor comprising, in combination, a casing, electrodes in the casing, a sheet fibrous material separating and insulating the electrodes from one another, and a liquid dielectric in the casing cooperatively associated with the electrodes and the sheet material, the sheet fibrous material being impregnated and coated with at least 25% by weight of cyanoethyl cellulose containing about 13% nitrogen and the liquid dielectric comprising in combination a mixture of diaryl sulfone and a substantial proportion of from 50% to 60% chlorinated diphenyl.

5. An electrical apparatus comprising, in combination, an electrical conductor and an insulating material applied to the conductor, the insulating material consisting essentially of sheet fibrous material impregnated and coated with at least 25% by weight of cyanoethyl cellulose containing about 13% nitrogen.

6. An electrical apparatus comprising, in combination, an electrical conductor, an insulating sheet material applied to the conductor, and a liquid dielectric cooperatively associated with the conductor and insulating material, the insulating sheet material consisting essentially of cyanoethyl cellulose containing about 13% nitrogen.

References Cited in the file of this patent

UNITED STATES PATENTS

| 2,341,553 | Houtz | Feb. 15, 1944 |
| 2,375,847 | Houtz | May 15, 1945 |
| 2,535,690 | Miller | Dec. 26, 1950 |
| 2,812,999 | Weisberg | Nov. 12, 1957 |